(12) United States Patent
Van de Voorde et al.

(10) Patent No.: US 12,281,626 B1
(45) Date of Patent: Apr. 22, 2025

(54) PISTON BODY FOR AN ENGINE HAVING SURFACE FEATURES FOR INTERACTING WITH BOUNDARY LAYER

(71) Applicant: Hyliion Holdings Corp, Cedar Park, TX (US)

(72) Inventors: Kevin Michael Van de Voorde, Cincinnati, OH (US); Victor Luis Marrero Ortiz, Humacao, PR (US); Joshua Tyler Mook, Cincinnati, OH (US)

(73) Assignee: Hyliion Holdings Corp., Cedar Park, TX (US)

( * ) Notice: Subject to any disclaimer, the term of this patent is extended or adjusted under 35 U.S.C. 154(b) by 0 days.

(21) Appl. No.: 18/771,335

(22) Filed: Jul. 12, 2024

(51) Int. Cl.
*F02F 3/00* (2006.01)
*F02F 3/02* (2006.01)
*B33Y 80/00* (2015.01)

(52) U.S. Cl.
CPC ............. *F02F 3/02* (2013.01); *B33Y 80/00* (2014.12)

(58) Field of Classification Search
CPC ...... F02G 1/044; F02G 2280/10; F02G 1/055; F02G 2255/10; F02B 63/041; F02B 63/04

USPC ...................................................... 123/193.6
See application file for complete search history.

(56) References Cited

U.S. PATENT DOCUMENTS

| 10,770,996 | B1* | 9/2020 | Waun | H02P 23/14 |
| 2018/0283319 | A1* | 10/2018 | Yates | F02G 1/055 |
| 2020/0370503 | A1* | 11/2020 | Notarnicola | F02G 1/043 |
| 2020/0370509 | A1* | 11/2020 | Mook | F23R 3/005 |

* cited by examiner

*Primary Examiner* — Long T Tran
*Assistant Examiner* — James J Kim
(74) *Attorney, Agent, or Firm* — Dority & Manning, P.A.

(57) ABSTRACT

A linear electric machine includes a shaft and at least one piston assembly operably coupled with the shaft. The piston assembly includes a piston, a piston body, and an expansion chamber. The piston body defines a dome structure at the expansion chamber. The piston is a domed piston corresponding to the dome structure. The linear electric machine also includes a heater body positioned at an outer end of the expansion chamber adjacent to the dome structure. The piston body further defines an exterior surface corresponding to a shape of the dome structure. The exterior surface includes a plurality of surface features protruding therefrom and is arranged between the heater body and the dome structure. The plurality of surface features decrease a heat load across the exterior surface of the piston body.

20 Claims, 7 Drawing Sheets

PISTON BODY FOR AN ENGINE HAVING SURFACE FEATURES FOR INTERACTING WITH BOUNDARY LAYER

FIELD

The present disclosure relates generally to engines, and more particularly to a piston assembly having a piston body with surface features, such as ripples, for interacting with a boundary layer thereof.

BACKGROUND

Renewable power generation has become increasingly popular as conventional methods of producing power (such as via fossil fuels) has taken a toll on existing power grids. Such renewable power generation is effective at powering vehicles, electric vehicle (EV) chargers, residential properties, schools, hospitals, commercial buildings, and much more.

Large vehicles may be used to efficiently transport cargo. Large, wheeled vehicles pull trailers to transport large volumes of cargo on land, wherein the combination of the vehicle and the trailer can weigh between 30,000 pounds up to 140,000 pounds for a tandem loaded trailer. These vehicles may be referred to as "powered semi-tractors", "semi-tractors", "semis", or "trucks." Trucks may be used on roads such as highways and in urban areas but may also be used on unimproved roads or uneven terrain. In a traditional truck with an internal combustion engine, the internal combustion engine may be sized in the range of 15 liters to provide enough power to propel the vehicle and the trailer.

As described herein with respect to the present disclosure, such vehicles may be designed with unique configurations capable of integrating one of several different types of engines, such as a closed-cycle engine, that includes a piston assembly having a piston body with surface features, such as ripples, for interacting with a boundary layer thereof.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the terms "first," "second," and "third" may be used interchangeably to distinguish one component from another and are not intended to signify a location or importance of the individual components. The terms "coupled," "fixed," "attached to," and the like refer to both direct coupling, fixing, or attaching, as well as indirect coupling, fixing, or attaching through one or more intermediate components or features, unless otherwise specified herein. The terms "upstream" and "downstream" refer to the relative direction with respect to a fluid within a fluid circuit. For example, "upstream" refers to the direction from which a fluid flows, and "downstream" refers to the direction to which the fluid moves. The term "selectively" refers to a component's ability to operate in various states (e.g., an ON state and an OFF state) based on manual and/or automatic control of the component.

Furthermore, any arrangement of components to achieve the same functionality is effectively "associated" such that the functionality is achieved. Hence, any two components herein combined to achieve a particular functionality may be seen as "associated with" each other such that the desired functionality is achieved, irrespective of architectures or intermedial components. Likewise, any two components so associated may also be viewed as being "operably connected" or "operably coupled" to each other to achieve the desired functionality, and any two components capable of being so associated may also be viewed as being "operably couplable" to each other to achieve the desired functionality. Some examples of operably couplable include, but are not limited to, physically mateable, physically interacting components, wirelessly interactable, wirelessly interacting components, logically interacting, and/or logically interactable components.

The singular forms "a," "an," and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about," "approximately," "generally," and "substantially," is not to be limited to the precise value specified. In at least some instances, the approximating language may correspond to the precision of an instrument for measuring the value, or the precision of the methods or apparatus for constructing or manufacturing the components and/or systems. For example, the approximating language may refer to being within a ten percent margin.

Moreover, the technology of the present application will be described in relation to exemplary embodiments. The word "exemplary" is used herein to mean "serving as an example, instance, or illustration." Any embodiment described herein as "exemplary" is not necessarily to be construed as preferred or advantageous over other embodiments. Additionally, unless specifically identified otherwise, all embodiments described herein should be considered exemplary.

As used herein, the term "and/or," when used in a list of two or more items, means that any one of the listed items may be employed by itself, or any combination of two or more of the listed items may be employed. For example, if a composition or assembly is described as containing components A, B, and/or C, the composition or assembly may contain A alone; B alone; C alone; A and B in combination; A and C in combination; B and C in combination; or A, B, and C in combination.

Figure 1:
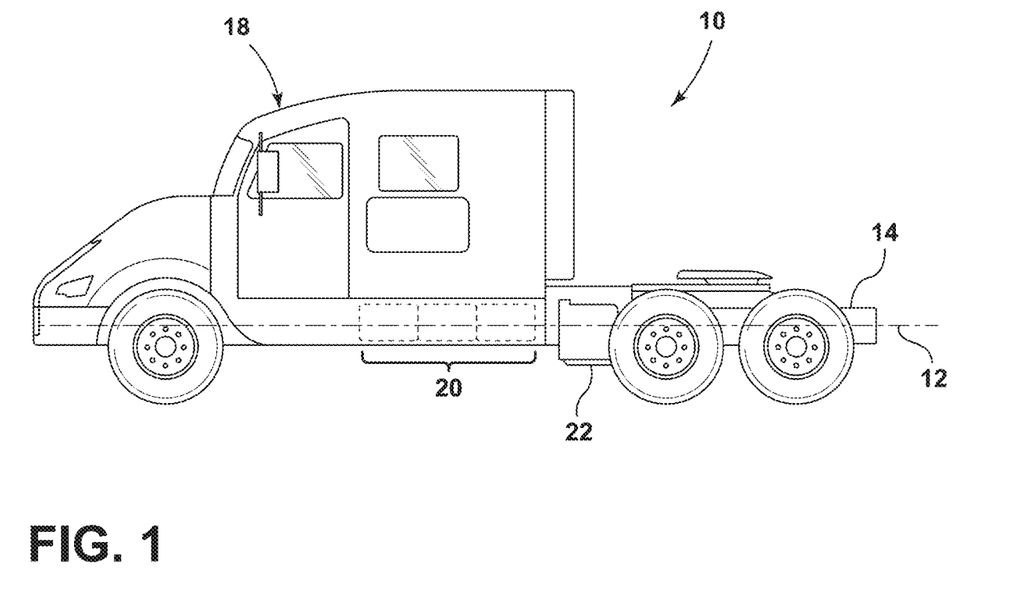
FIG. 1 illustrates a side view of a wheeled vehicle capable of transporting cargo over an extended range in accordance with aspects of the present subject matter.
Figure 2:
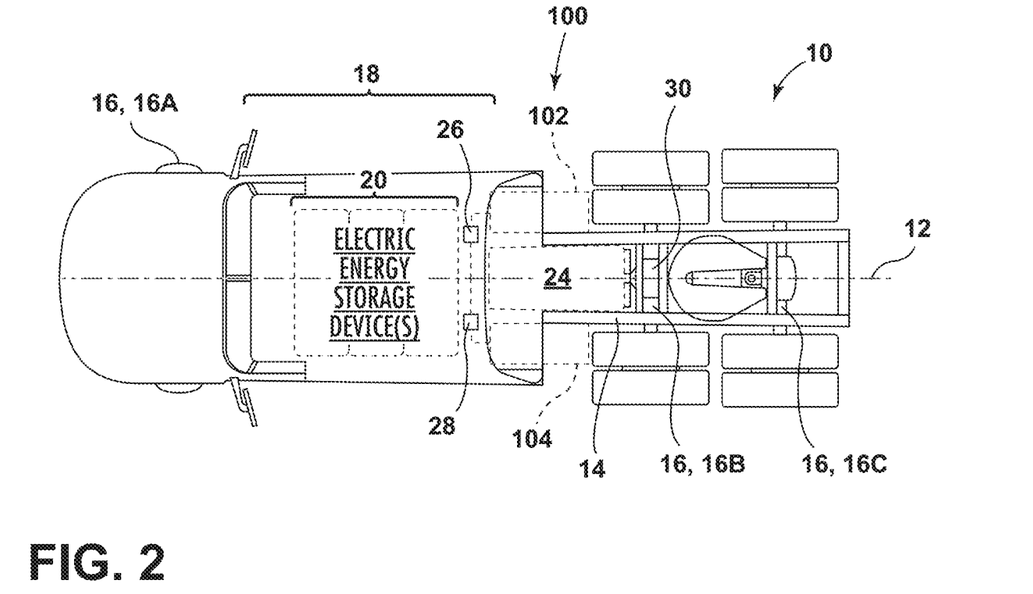
FIG. 2 illustrates a detailed, top view of a wheeled vehicle capable of transporting cargo over an extended range in accordance with aspects of the present subject matter.

Referring now to the drawings, FIGS. 1 and 2 illustrate various views of a wheeled vehicle 10 along a fore/aft axis 12 according to the present disclosure. As shown generally in FIGS. 1 and 2, the vehicle 10 may include, but are not limited to, a chassis 14, which may support multiple axles 16 and/or a cab 18. In various examples, the chassis 14 may be formed with two frame members such as C-channels arranged parallel to each other. The one or more axles 16 may be operably coupled to the chassis 14. In some instances, the one or more axles 16 may include a front axle 16A and a pair of rear axles 16B, 16C.

Additionally, the vehicle 10 may include an engine assembly 100 that may include one or more closed-cycle engines 102, 104, an array of energy storage devices 20 (e.g., batteries), and/or a motor/generator 22 coupled to at least one of the axles 16. Moreover, the vehicle 10 may include one or more fuel tanks 24 operably coupled with the one or more closed-cycle engines 102, 104.

Furthermore, the vehicle 10 may be equipped with one or more power converters 26, 28 coupled to the closed-cycle engines 102, 104 and the array of energy storage devices 20. In some cases, an array of energy storage devices 20 may be positioned in various locations on the vehicle 10. For instance, the energy storage devices 20 may be located between the rails of the chassis 14, under the rails of the chassis 14, around the rails of the chassis 14, and/or in any other practicable location. Moreover, the array of energy storage devices 20 may be connected in series, parallel, and/or some combination. In operation, electric power generated by the motor/generator 22 may be used to charge the array of energy storage devices 20.

With further reference to FIGS. 1 and 2, the motor/generator 22 may be coupled to at least one of the axles 16. For example, in some instances, the motor/generator 22 may be integrated with one of the axles 16 as an e-axle configuration or located in a hub of a wheel coupled to one of the axles 16 as a hub motor/generator configuration. Additionally, or alternatively, the motor/generator 22 may be operably coupled to gearboxes or differentials of the vehicle 10. For example, the motor/generator 22 may be coupled to a three-speed centralized gearbox 30 with a two-speed rear differential 38 to provide six discrete gear ratios. In some examples, the vehicle 10 may be configured with a plurality of motors/generators 22, with a respective motor/generator 22 coupled to each wheel or pair of wheels.

Figure 3:
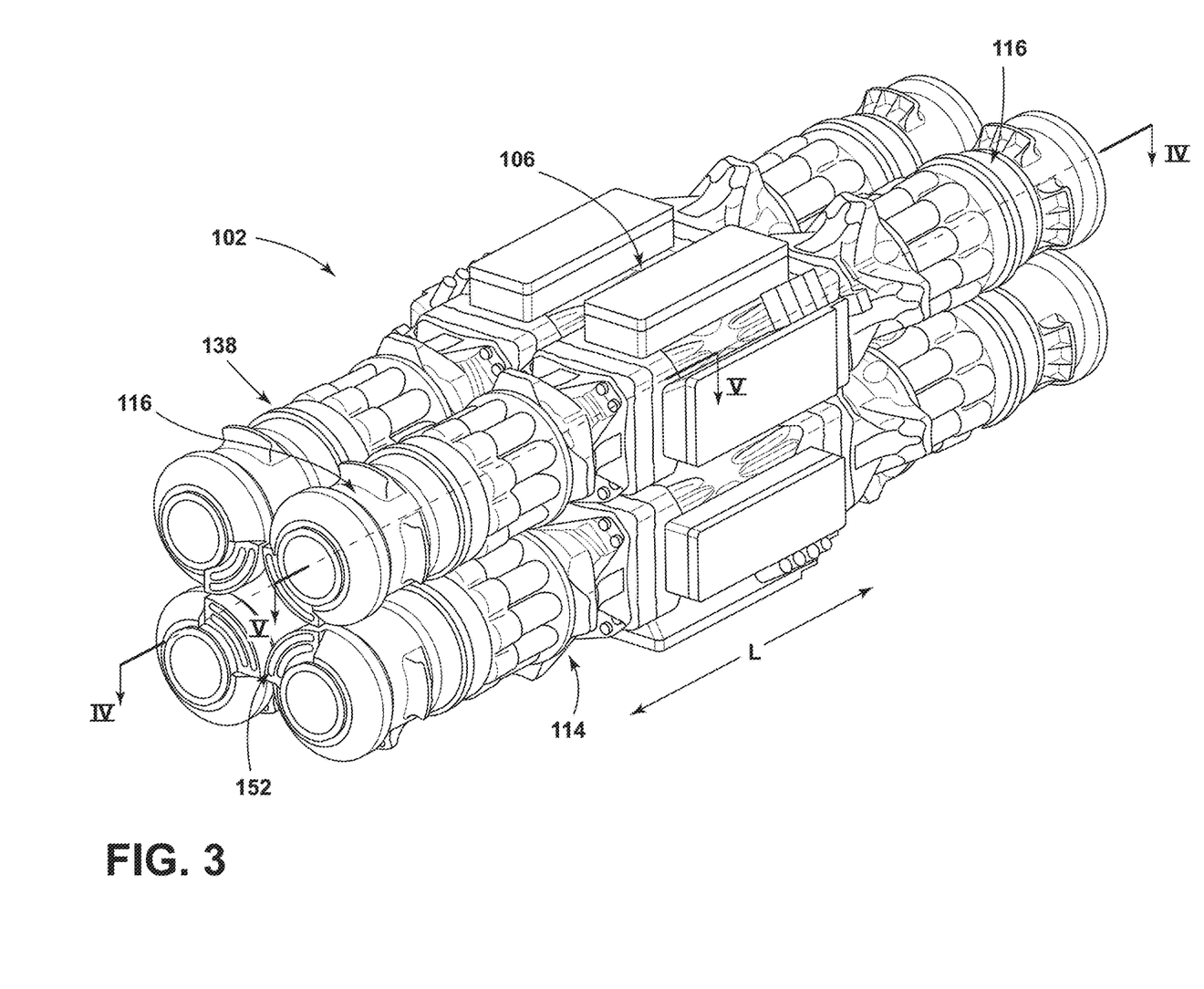
FIG. 3 illustrates a perspective view of a closed-cycle engine for a vehicle in accordance with aspects of the present subject matter.
Figure 4:
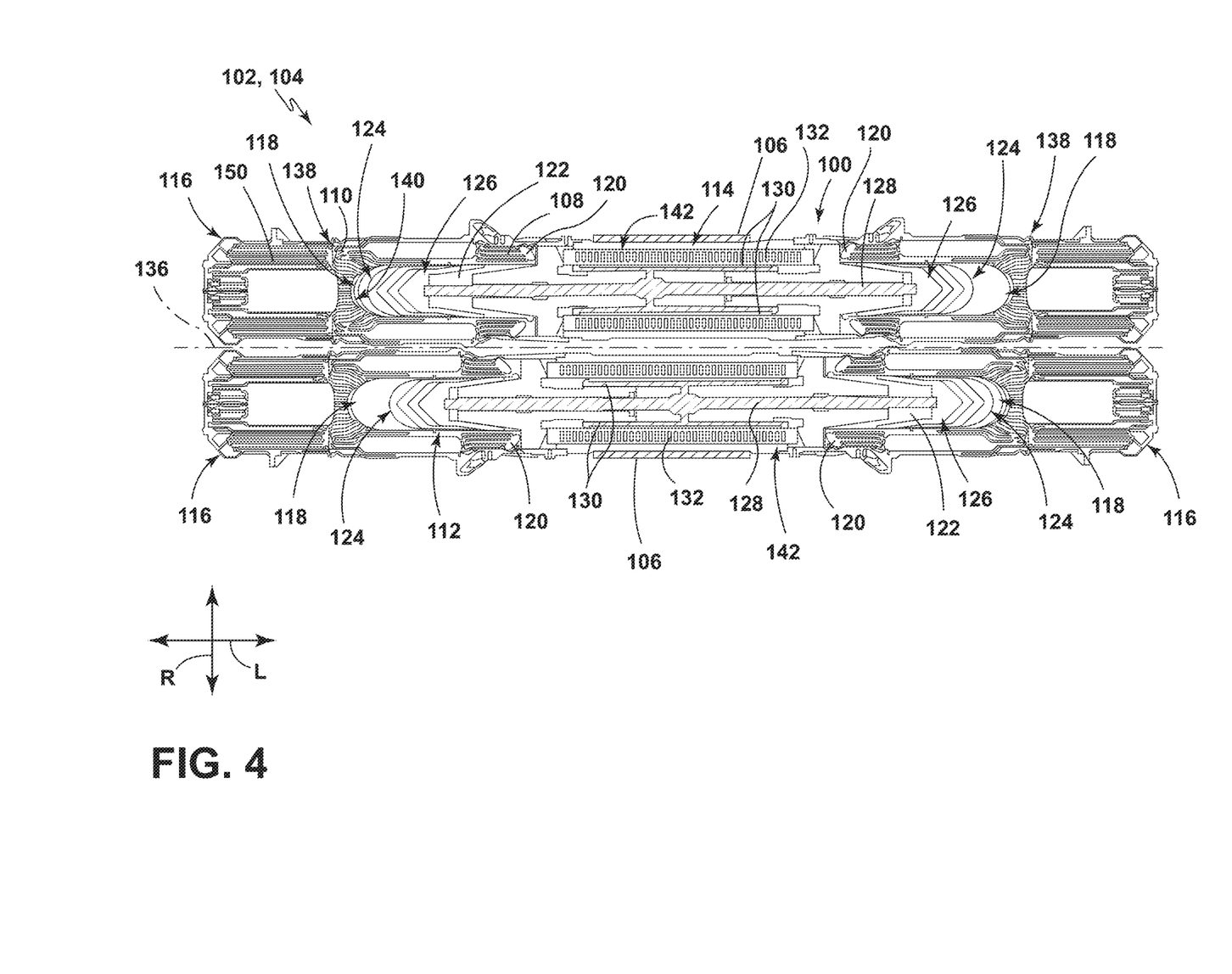
FIG. 4 illustrates a cross-sectional view of one of the closed-cycle engines taken along the line IV-IV of FIG. 3 in accordance with aspects of the present subject matter.
Figure 5:
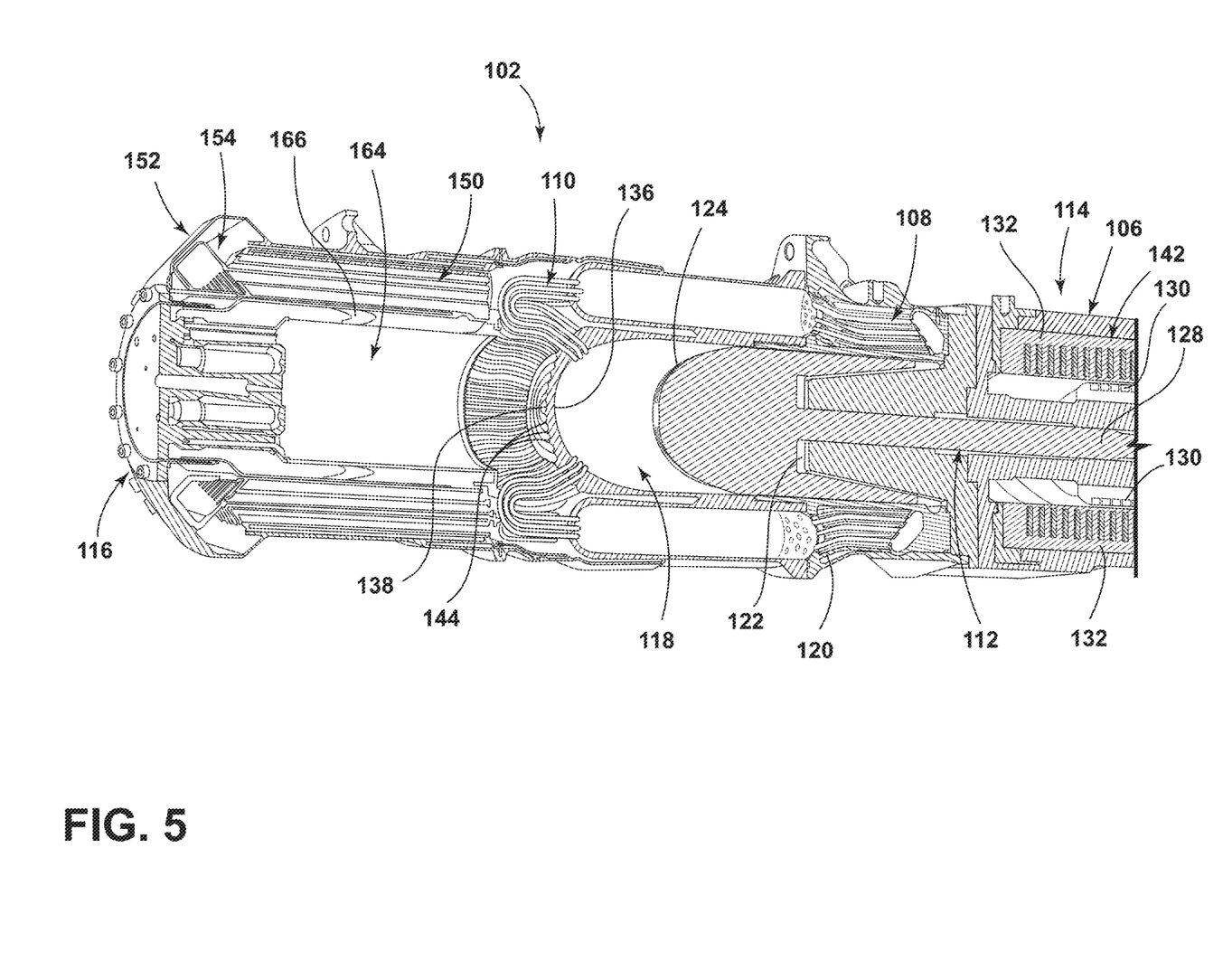
FIG. 5 illustrates a cross-sectional view of one of the closed-cycle engines taken along the line V-V of FIG. 3 in accordance with aspects of the present subject matter.

Referring now to FIGS. 3-5, one of the closed-cycle engines 102, 104 capable of being operably coupled to a load device 106 is illustrated according to various aspects of the present disclosure. As shown in FIGS. 3-5, the closed-cycle engine 102, 104 may contain an engine working fluid to which and from which thermal energy is exchanged at a respective cold side heat exchanger 108 and a hot side heat exchanger 110. In various instances, any suitable engine working fluid may be utilized in accordance with the present disclosure. For example, the engine working fluid may include a gas, such as an inert gas. For instance, a noble gas, such as helium may be utilized as the engine working fluid. In various cases, the working fluids may be inert, such that they generally do not participate in chemical reactions such as oxidation within the environment of the closed-cycle engine 102, 104. Various noble gasses that may be utilized by the closed-cycle engine 102, 104 may include monoatomic gases, such as helium, neon, argon, krypton, or xenon, as well as combinations of these. In several examples, the engine working fluid may include air, oxygen, nitrogen, hydrogen, carbon dioxide, any other practicable fluid, as well as combinations of these. In still various instances, the engine working fluid may be liquid fluids of one or more elements described herein, or combinations thereof. It will be appreciated that various examples of the engine working fluid may include particles or other substances as appropriate for the engine working fluid.

In various cases, the load device 106 is a mechanical work device or an electric machine. For example, the load device 106 may be a pump, compressor, or other work device. Additionally, or alternatively, the load device 106 may be an electric machine that is configured as a generator producing electric energy from the movement of a piston assembly 112 at the closed-cycle engine 102, 104. In still another example, the electric machine may be configured as a motor that may provide motive force to move or actuate the piston assembly 112, such as to provide initial movement (e.g., a starter motor). In still various examples, the electric machine may be configured as a motor and generator or another electric machine.

As illustrated in FIGS. 3-5, the closed-cycle engine 102, 104 may include an engine body 114 and a pair of housings 116 disposed on opposing sides of the engine body 114. For example, a first housing 116 may be disposed at a first side portion of the engine body 114 and a second housing 116 may be disposed at a second side portion of the engine body 114. In still other examples, a plurality of engine bodies 114 may be provided, and/or a single housing 116 or a multitude of housings 116 may be provided.

In various embodiments, as shown in FIG. 4, the hot side heat exchanger 110 may output thermal energy to the engine working fluid at an expansion chamber 118 of the closed-cycle engine 102, 104. The hot side heat exchanger 110 may be positioned proximate to the expansion chamber 118 of the engine in thermal communication with the housing 116. In other examples, the hot side heat exchanger 110 may be separate from the housing 116, such that the heating working fluid is provided in thermal communication, or additionally, in fluid communication with the hot side heat exchanger 110. In some cases, the hot side heat exchanger 110 may be positioned in thermal communication with the housing 116 and the expansion chamber 118 of the closed-cycle engine 102, 104 such as to receive thermal energy from the housing 116 and provide thermal energy to the engine working fluid within the closed-cycle engine 102, 104.

In still various examples, the housing 116 may include a single thermal energy output source to a single expansion chamber 118 of the engine. As such, the closed-cycle engine 102, 104 may include a plurality of heater assemblies each providing thermal energy to the engine working fluid at each expansion chamber 118. In other embodiments, such as depicted in regard to FIG. 4, the housing 116 may provide thermal energy to a plurality of expansion chambers 118 of the closed-cycle engine 102, 104.

The closed-cycle engine 102, 104 may further include a chiller assembly 120. The chiller assembly 120 may be configured to receive and displace thermal energy from a compression chamber 122 of the closed-cycle engine 102, 104. Additionally, the cold side heat exchanger 108 may be thermally coupled to the compression chamber 122 of the closed cycle engine 102, 104, and the chiller assembly 120. In some instances, the cold side heat exchanger 108 and a piston body 126 defining the compression chamber 122 of the closed-cycle engine 102, 104 may together be defined as an integral, unitary structure. In still various examples, the cold side heat exchanger 108, at least a portion of the piston body 126 defining the compression chamber 122, and at least a portion of the chiller assembly 120 may together define an integral, unitary structure.

In various embodiments, as shown in FIG. 4, the chiller assembly 120 may be a bottoming cycle to the closed-cycle engine 102, 104. As such, the chiller assembly 120 may be configured to receive thermal energy from the closed-cycle engine 102, 104. The thermal energy received at the chiller assembly 120, such as through a cold side heat exchanger 108, may be added to a chiller working fluid at the chiller assembly 120. In various examples, the chiller assembly 120 defines a Rankine cycle system through which the chiller working fluid flows in a closed loop arrangement with a compressor. In some examples, the chiller working fluid may be in a closed-loop arrangement with an expander. In various cases, the cold side heat exchanger 108 may include a condenser or radiator. The cold side heat exchanger 108 may be positioned downstream of the compressor and upstream of the expander and in thermal communication with the compression chamber 122 of the closed-cycle engine 102, 104. In various embodiments, the cold side heat exchanger 108 may generally define an evaporator receiving thermal energy from the closed-cycle engine 102, 104.

Various examples of the closed-cycle engine 102, 104 may include control systems and methods of controlling various sub-systems disclosed herein, such as, but not limited to, the fuel source, the oxidizer source, the cooling fluid source, the housing 116, the chiller assembly 120, and the load device 106, including any flow rates, pressures, temperatures, loads, discharges, frequencies, amplitudes, or other suitable control properties associated with the closed-cycle engine 102, 104.

In some examples, the control system may control the closed-cycle engine 102, 104 to generate a temperature differential, such as a temperature differential at the engine working fluid relative to the heating working fluid and the chiller working fluid. Thus, the closed-cycle engine 102, 104 defines a hot side, such as at the expansion chamber 118, and a cold side, such as at the compression chamber 122. The temperature differential causes free piston assemblies 112 to move within their respective piston chambers defined at respective piston bodies 126. The movement of pistons 124 within the respective piston bodies 126 causes the electric machine to generate electrical power. The generated electrical power may be provided to the energy storage devices 20 for charging thereof. The control system monitors one or more operating parameters associated with the closed-cycle engine 102, 104, such as piston movement (e.g., amplitude and position), as well as one or more operating parameters associated with the electric machine, such as voltage or electric current. Based on such parameters, the control system generates control commands that are provided to one or more controllable devices of the closed-cycle engine 102, 104. The controllable devices execute control actions in accordance with the control commands. Accordingly, the desired output of the closed-cycle engine 102, 104 may be achieved.

Referring still to FIG. 4, each piston assembly 112 may be positioned within a volume or piston chamber defined by a wall defining the piston body 126. The volume within the piston body 126 is separated into a first chamber, or hot chamber, or expansion chamber 118 and a second chamber, or cold chamber (relative to the hot chamber), or compression chamber 122 by a piston 124 of the piston assembly 112. The expansion chamber 118 may be positioned thermally proximally to the housing 116 relative to the compression chamber 122 thermally distal to the housing 116. The compression chamber 122 may be positioned thermally proximal to the chiller assembly 120 relative to the expansion chamber 118 thermally distal to the chiller assembly 120.

In various instances, the piston assembly 112 may be configured as a double-ended piston assembly 112 in which a pair of pistons 124 is each coupled to a connection member 128. The connection member 128 may generally define a rigid shaft or rod extended along a direction of motion of the piston assembly 112. In other instances, the connection members 128 may include one or more springs or spring assemblies, such as further provided herein, providing flexible or non-rigid movement of the connection member 128. In still other instances, the connection member 128 may further define substantially U-shaped connections or V-shaped connections between the pair of pistons 124.

Each piston 124 may be positioned within the piston body 126 such as to define the expansion chamber 118 and the compression chamber 122 within the volume of the piston body 126. The load device 106 may be operably coupled to the piston assembly 112 such as to extract energy therefrom, provide energy thereto, or both. The load device 106 may define an electric machine that is in magnetic communication with the closed-cycle engine 102, 104 via the connection member 128. In various examples, the piston assembly 112 may include a load member 130 positioned in operable communication with a stator assembly 132 of the electric machine. The stator assembly 132 may generally include a magnet array and a plurality of windings wrapped circumferentially relative to the piston assembly 112 and extended along a lateral direction L. In some instances, such as depicted in regard to FIG. 4, the load member 130 is connected to the connection member 128. In some examples, the linear motion of the load member 130 in conjunction with the piston assembly 112 may generate electricity via the magnetic communication between the stator assembly 132 and the load member 130.

Referring still to FIG. 4, in various embodiments, the hot side heat exchanger 110 may further define at least a portion of the expansion chamber 118. In some cases, the hot side heat exchanger 110 defines a unitary or monolithic structure with at least a portion of the piston body 126, such as to define at least a portion of the expansion chamber 118. In some embodiments, the housing 116 may further define at least a portion of the hot side heat exchanger 110, such as to define a unitary or monolithic structure with the hot side heat exchanger 110.

Furthermore, as shown in FIGS. 3-6, the piston body 126 may define a dome structure 140 within the expansion chamber 118. In such embodiments, the dome structure 140 may provide reduced surface area heat losses across an outer end 136 of the expansion chamber 118. In various instances, the pistons 124 of the piston assembly 112 may also include domed pistons 124 corresponding to the dome structure 140. The dome structure 140, the domed piston 124, or both may provide higher compression ratios at the chambers 118, 122, such as to improve power density and output. Moreover, as shown, the piston body 126 further defines an exterior surface 138 corresponding to a shape of the dome structure 140.

In various examples, such as the one shown in FIG. 4, the load device 106 may be positioned at the interior section 134 of the closed-cycle engine 102, 104 between laterally opposing pistons 124. The load device 106 may further include a machine body 142 positioned laterally between the piston bodies 126. The machine body 142 surrounds and houses the stator assembly 132 of the load device 106 defining the electric machine. The machine body 142 may further surround the load member 130 of the electric machine attached to the connection member 128 of the piston assembly 112.

Referring now to FIGS. 3-6, in some examples the closed-cycle engine 102, 104 may include the engine body 114 and the pair of housings 116 disposed on opposing sides of the engine body 114, one of which is illustrated in FIG. 5. In various examples, the housing 116 may include a heater body 150 (also referred to herein as a recuperator 150) positioned at the outer end 136 of the expansion chamber 118 adjacent to the dome structure 140. The recuperator 150 may include or be operably coupled with an intake fluid channel 152 that defines an intake fluid pathway 154, a discharge channel 156 that defines a discharge pathway 158, and/or a heat exchanger channel 160 that defines an exhaust gas pathway 162 from the heat exchanger 110 to the recuperator 150.

In some instances, the intake fluid channel 152 may define at least a portion of an intake fluid pathway 154 that provides intake fluid to the recuperator 150. In some cases, the intake fluid may be pressurized, such as via a compressor (not shown), to induce a flow of intake fluid into the intake fluid pathway 154. The heat exchanger channel 160 may provide exhaust gas from the heat exchanger 110 to the recuperator 150. In turn, the intake fluid and the exhaust gas mix and provide a first portion of a fresh combustion gas to a combustion chamber 164/mixing conduit via an exhaust gas recirculation (EGR) ejector 166. The first portion of the fresh combustion gas 146 may be directed into the expansion chamber 118 while a fuel nozzle introduces a flow of fuel, which may include a liquid, gaseous fuel. A second portion of the fresh combustion gas may be directed to the discharge channel 156, which is then discharged from the housing 116 along the discharge pathway 158.

In the expansion chamber 118, the fuel combines with the first portion of the fresh combustion gas and is ignited, for example, by a glow plug or a spark plug. The expansion chamber 118 may provide a vortex combustion pattern with a circular flow. The centripetal force of the vortex combustion pattern may draw the combustion flame radially or concentrically inward while propelling unburnt combustion gas radially or concentrically outward. The exhaust gas may be exhausted from the expansion chamber 118 and into the hot-side heat exchanger 110. The exhaust gas may flow from the hot-side heat exchanger 110 to the recuperator 150 to become the exhaust gas that may then be provided to the recuperator 150.

Figure 6:
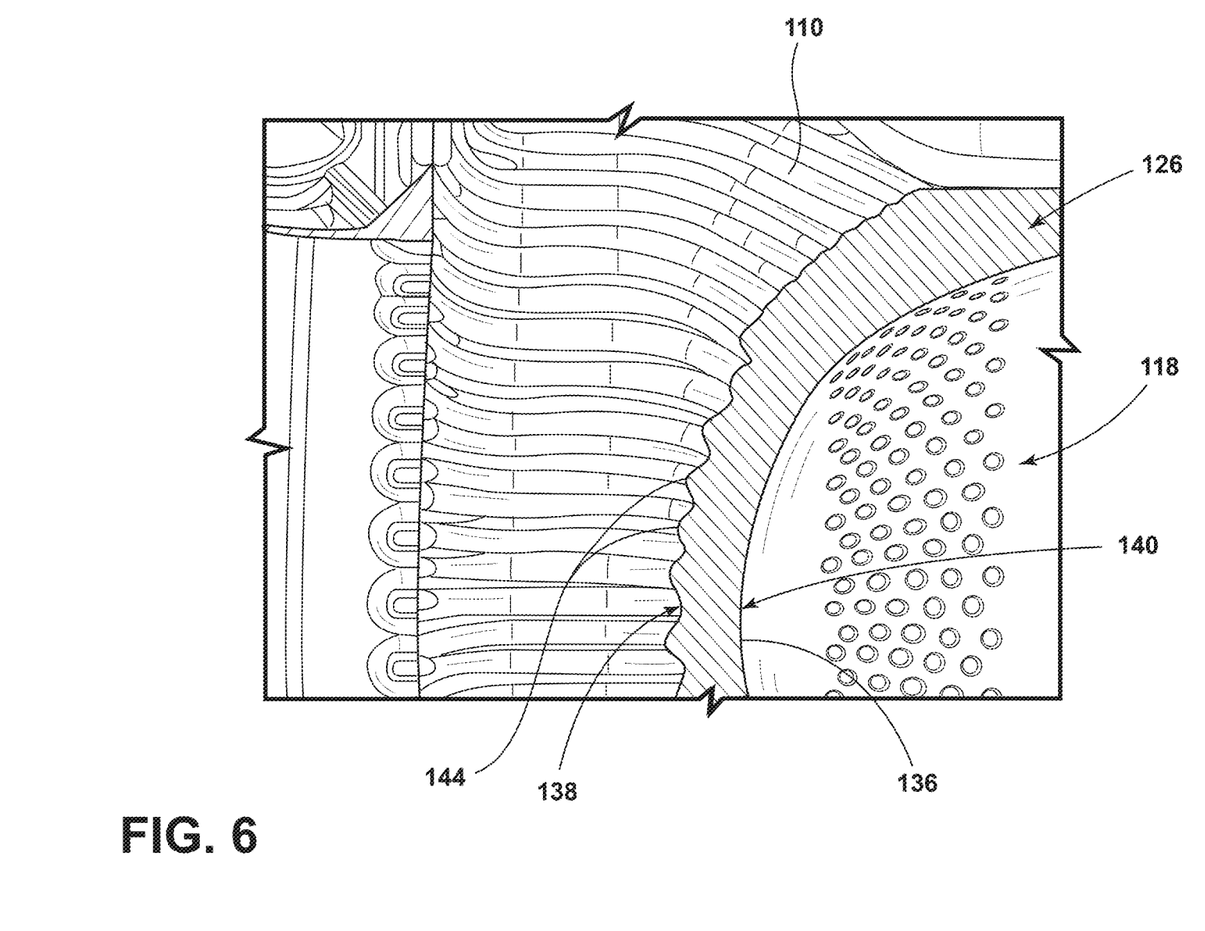
FIG. 6 illustrates a detailed cross-sectional view of a portion of the closed-cycle engine illustrated in FIG. 5.
Figure 7:
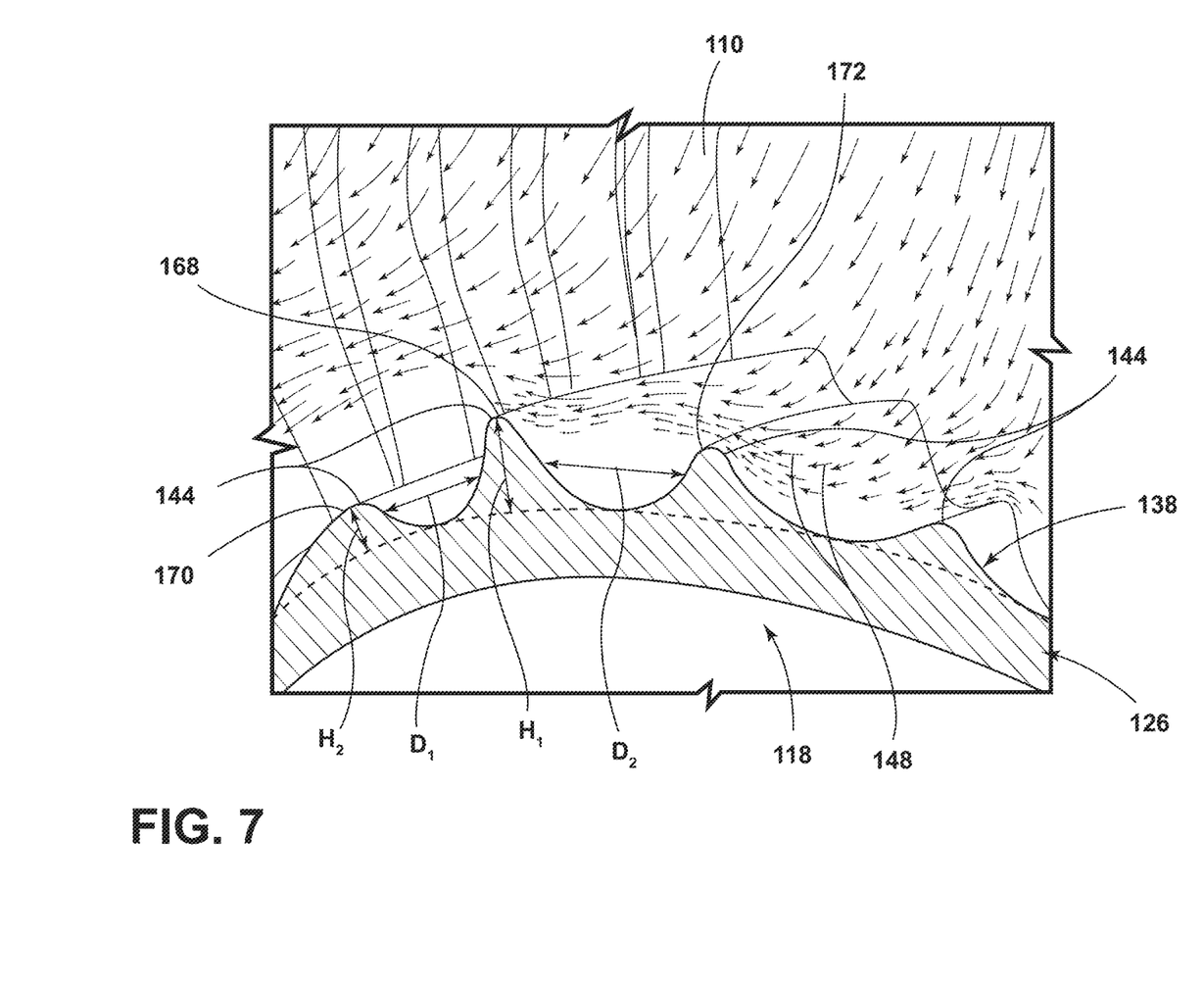
FIG. 7 illustrates a detailed cross-sectional view of a portion of a dome structure of a piston body of a closed-cycle engine according to the present disclosure, particularly illustrated heat flow across a plurality of surface features on an exterior surface of the piston body.

Referring particularly to FIGS. 5-7, various cross-sectional views of portions of a linear electric machine, such as the of the closed-cycle engine 102, 104, are illustrated. More specifically, as shown, the exterior surface 138 of the piston body 126 includes a plurality of surface features 144 protruding therefrom. Moreover, as shown, the plurality of surface features 144 are arranged between the heater body 150 and the dome structure 140 for interacting with a boundary layer across the exterior surface of the piston body 126. Accordingly, in such embodiments, the plurality of surface features 144 are configured to decrease a heat load across the exterior surface 138 of the piston body 126.

Referring particularly to FIG. 7, each of the plurality of surface features 144 are arranged normal to heat flow (as indicated via arrows 148 from the heater body 150. Moreover, as shown, two or more of the plurality of surface features 144 may be variable in shape, size, and/or spacing. As an example, and as shown in FIG. 7, the plurality of surface features 144 may include a first surface feature 168 adjacent to a second surface feature 170. Further, as shown, the first surface feature 168 has a first height H1 and the second surface feature has a second height H2. Thus, as shown, the first height H1 of the first surface feature 168 is greater than the second height H2 of the second surface feature 170. In further embodiments, as shown, it may be understood that the heights of the surface features 144 may vary across the exterior surface 138 as desired. In addition, as shown and mentioned, two or more of the plurality of surface features 144 may be variable in spacing. For example, as shown, a first pair of adjacent surface features 144 (such as first and second surface features 168, 170) may be spaced apart by a first distance $D_1$, whereas a second pair of adjacent surface features 144 (such as first and third surface features 168, 172) may be spaced apart by a second distance $D_2$. In further embodiments, as shown, it may be understood that the distances between adjacent surface features 144 may vary across the exterior surface 138 as desired.

In still further embodiments, as shown particularly in FIG. 5, the plurality of surface features 144 may be arranged in a concentric pattern (half of which is illustrated). For example, in an embodiment, the plurality of surface features 144 may correspond to a plurality of ripples having a wave-like pattern, with the waves being shaped similar to capillary waves found in nature.

Figure 8:
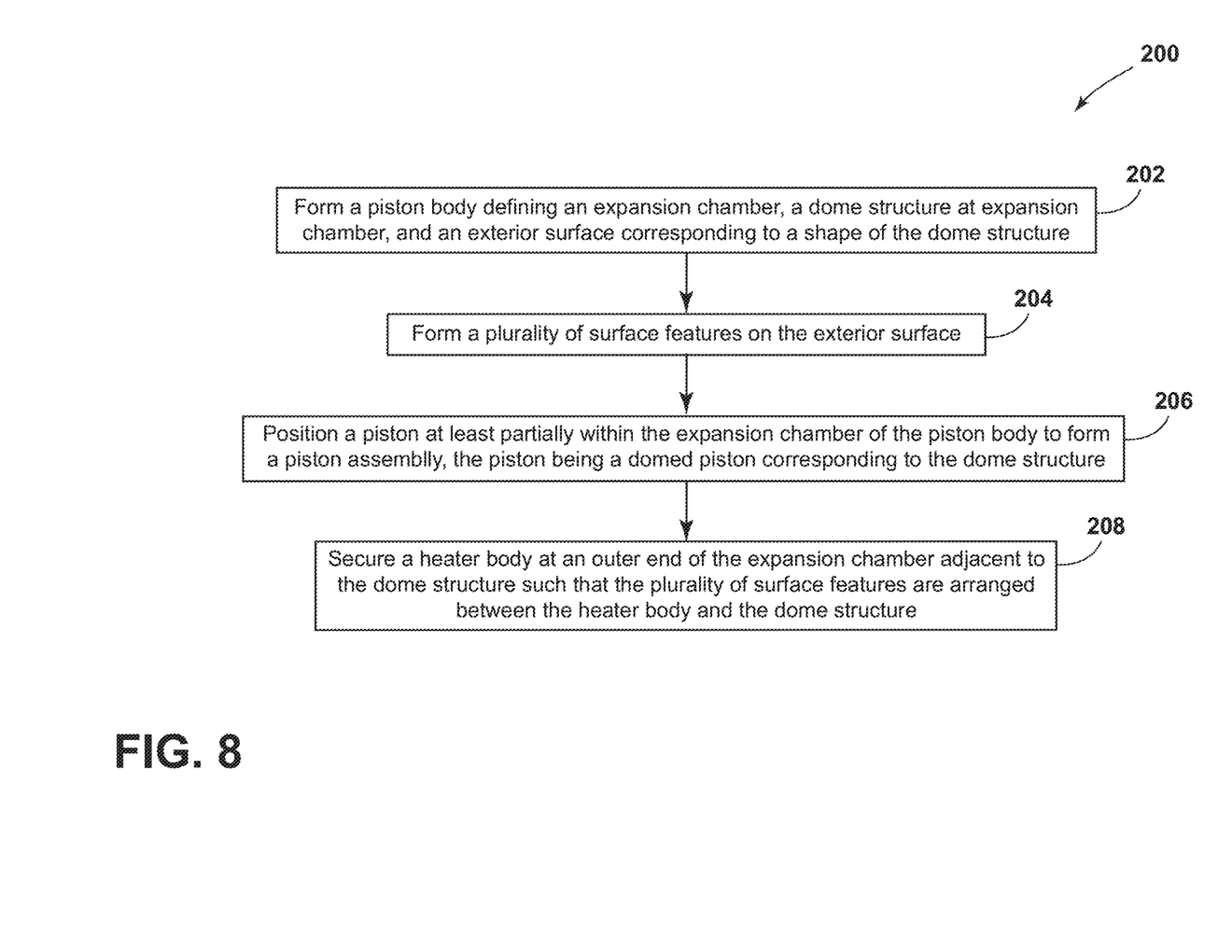
FIG. 8 illustrates a flow diagram of an embodiment of a method of manufacturing an engine body according to the present disclosure.

Referring now to FIG. 8, a flow diagram of an embodiment of a method 200 of manufacturing an engine body is illustrated according to the present disclosure. In general, the method 200 of FIG. 8 will be described herein with reference to the engine body 114 of FIGS. 1-7. However, it should be appreciated that the disclosed method 200 may apply to other configurations of engine bodies having any suitable configuration. In addition, although FIG. 8 depicts steps performed in a particular order for purposes of illustration and discussion, the methods described herein are not limited to any particular order or arrangement. One skilled in the art, using the disclosures provided herein, will appreciate that various steps of the methods can be omitted, rearranged, combined and/or adapted in various ways.

As shown at (202), the method 200 includes forming a piston body 126 defining an expansion chamber 118, a dome structure 140 at the expansion chamber 118, and an exterior surface 138 corresponding to a shape of the dome structure 140. As shown at (204), the method 200 includes forming a plurality of surface features 144 on the exterior surface 138. For example, in an embodiment, forming the plurality of surface features 144 on the exterior surface 138 may include utilizing an additive manufacturing process to form the plurality of surface features 144 on the exterior surface 138. As shown at (206), the method 200 includes positioning a piston 124 at least partially within the expansion chamber 118 of the piston body 126 to form a piston assembly 118. In such embodiments, the piston 124 may be a domed piston corresponding to the shape of the dome structure 140. As shown at (208), the method 200 includes securing a heater body 150 at an outer end of the expansion chamber 118 adjacent to the dome structure 140 such that the plurality of surface features 144 are arranged between the heater body 150 and the dome structure 140.

Further aspects are provided by the subject matter of the following clauses:

A linear electric machine, comprising: a shaft; at least one piston assembly operably coupled with the shaft, the at least one piston assembly comprising a piston, a piston body, and an expansion chamber, the piston body defining a dome structure at the expansion chamber, the piston being a domed piston corresponding to the dome structure; and a heater body positioned at an outer end of the expansion chamber adjacent to the dome structure, wherein the piston body further defines an exterior surface corresponding to a shape of the dome structure, the exterior surface comprising a plurality of surface features protruding therefrom and being arranged between the heater body and the dome structure, and wherein the plurality of surface features decrease a heat load across the exterior surface of the piston body.

The linear electric machine of any preceding clause, wherein each of the plurality of surface features are arranged normal to heat flow from the heater body.

The linear electric machine of any preceding clause, wherein two or more of the plurality of surface features are variable in shape.

The linear electric machine of any preceding clause, wherein two or more of the plurality of surface features are variable in size.

The linear electric machine of any preceding clause, wherein the plurality of surface features comprise a first surface feature adjacent to a second surface feature, the first surface feature having a first height and the second surface feature having a second height, the first height being greater than the second height.

The linear electric machine of any preceding clause, wherein two or more of the plurality of surface features are variable in spacing.

The linear electric machine of any preceding clause, wherein the plurality of surface features are arranged in a concentric pattern.

The linear electric machine of any preceding clause, wherein the plurality of surface features correspond to a plurality of ripples having a wave-like pattern.

The linear electric machine of any preceding clause, wherein the linear electric machine is a closed-cycle engine.

An engine body, comprising: a piston; a piston body; an expansion chamber, the piston body defining a dome structure at the expansion chamber, the piston being a domed piston corresponding to the dome structure; and a heater body positioned at an outer end of the expansion chamber adjacent to the dome structure, wherein the piston body further defines an exterior surface corresponding to a shape of the dome structure, the exterior surface comprising a plurality of surface features protruding therefrom and being arranged between the heater body and the dome structure, and wherein the plurality of surface features decrease a heat load across the exterior surface of the piston body.

The engine body of any preceding clause, wherein each of the plurality of surface features are arranged normal to heat flow from the heater body.

The engine body of any preceding clause, wherein two or more of the plurality of surface features are variable in shape.

The engine body of any preceding clause, wherein two or more of the plurality of surface features are variable in size.

The engine body of any preceding clause, wherein the plurality of surface features comprise a first surface feature adjacent to a second surface feature, the first surface feature having a first height and the second surface feature having a second height, the first height being greater than the second height.

The engine body of any preceding clause, wherein two or more of the plurality of surface features are variable in spacing.

The engine body of any preceding clause, wherein the plurality of surface features are arranged in a concentric pattern.

The engine body of any preceding clause, wherein the plurality of surface features correspond to a plurality of ripples having a wave-like pattern.

A method of manufacturing an engine body, the method comprising: forming a piston body defining an expansion chamber, a dome structure at the expansion chamber, and an exterior surface corresponding to a shape of the dome structure; forming a plurality of surface features on the exterior surface; positioning a piston at least partially within the expansion chamber of the piston body to form a piston assembly, the piston being a domed piston corresponding to the dome structure; and securing a heater body at an outer end of the expansion chamber adjacent to the dome structure such that the plurality of surface features are arranged between the heater body and the dome structure.

The method of any preceding clause, wherein forming the plurality of surface features on the exterior surface further comprises utilizing an additive manufacturing process to form the plurality of surface features on the exterior surface.

The method of any preceding clause, further comprising utilizing the additive manufacturing process to form the plurality of surface features on the exterior surface normal to heat flow from the heater body.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

We claim:

1. A linear electric machine, comprising:
a shaft;
at least one piston assembly operably coupled with the shaft, the at least one piston assembly comprising a piston, a piston body, and an expansion chamber, the piston body defining a dome structure at the expansion chamber, the piston being a domed piston corresponding to the dome structure; and
a heater body positioned at an outer end of the expansion chamber adjacent to the dome structure,
wherein the piston body further defines an exterior surface corresponding to a shape of the dome structure, the exterior surface comprising a plurality of surface features protruding therefrom and being arranged between the heater body and the dome structure, and
wherein the plurality of surface features decrease a heat load across the exterior surface of the piston body.

2. The linear electric machine of claim 1, wherein each of the plurality of surface features are arranged normal to heat flow from the heater body.

3. The linear electric machine of claim 1, wherein two or more of the plurality of surface features are variable in shape.

4. The linear electric machine of claim 1, wherein two or more of the plurality of surface features are variable in size.

5. The linear electric machine of claim 3, wherein the plurality of surface features comprise a first surface feature adjacent to a second surface feature, the first surface feature having a first height and the second surface feature having a second height, the first height being greater than the second height.

6. The linear electric machine of claim 1, wherein two or more of the plurality of surface features are variable in spacing.

7. The linear electric machine of claim 1, wherein the plurality of surface features are arranged in a concentric pattern.

8. The linear electric machine of claim 1, wherein the plurality of surface features correspond to a plurality of ripples having a wave-like pattern.

9. The linear electric machine of claim 1, wherein the linear electric machine is a closed-cycle engine.

10. An engine body, comprising:
a piston;
a piston body;
an expansion chamber, the piston body defining a dome structure at the expansion chamber, the piston being a domed piston corresponding to the dome structure; and
a heater body positioned at an outer end of the expansion chamber adjacent to the dome structure,
wherein the piston body further defines an exterior surface corresponding to a shape of the dome structure, the exterior surface comprising a plurality of surface features protruding therefrom and being arranged between the heater body and the dome structure, and
wherein the plurality of surface features decrease a heat load across the exterior surface of the piston body.

11. The engine body of claim 10, wherein each of the plurality of surface features are arranged normal to heat flow from the heater body.

12. The engine body of claim 10, wherein two or more of the plurality of surface features are variable in shape.

13. The engine body of claim 10, wherein two or more of the plurality of surface features are variable in size.

14. The engine body of claim 13, wherein the plurality of surface features comprise a first surface feature adjacent to a second surface feature, the first surface feature having a first height and the second surface feature having a second height, the first height being greater than the second height.

15. The engine body of claim 10, wherein two or more of the plurality of surface features are variable in spacing.

16. The engine body of claim 10, wherein the plurality of surface features are arranged in a concentric pattern.

17. The engine body of claim 10, wherein the plurality of surface features correspond to a plurality of ripples having a wave-like pattern.

18. A method of manufacturing an engine body, the method comprising:
forming a piston body defining an expansion chamber, a dome structure at the expansion chamber, and an exterior surface corresponding to a shape of the dome structure;
forming a plurality of surface features on the exterior surface;
positioning a piston at least partially within the expansion chamber of the piston body to form a piston assembly, the piston being a domed piston corresponding to the dome structure; and
securing a heater body at an outer end of the expansion chamber adjacent to the dome structure such that the plurality of surface features are arranged between the heater body and the dome structure.

19. The method of claim 18, wherein forming the plurality of surface features on the exterior surface further comprises utilizing an additive manufacturing process to form the plurality of surface features on the exterior surface.

20. The method of claim 19, further comprising utilizing the additive manufacturing process to form the plurality of surface features on the exterior surface normal to heat flow from the heater body.

* * * * *